US008400760B2

(12) United States Patent
Howard et al.

(10) Patent No.: US 8,400,760 B2
(45) Date of Patent: Mar. 19, 2013

(54) POWER DISTRIBUTION DEVICE

(75) Inventors: Matt Howard, Hayden, ID (US); Matt Hepler, Hayden, ID (US)

(73) Assignee: Transtector Systems, Inc., Hayden, ID (US)

( * ) Notice: Subject to any disclaimer, the term of this patent is extended or adjusted under 35 U.S.C. 154(b) by 88 days.

(21) Appl. No.: 12/980,108

(22) Filed: Dec. 28, 2010

(65) Prior Publication Data

US 2011/0159727 A1 Jun. 30, 2011

Related U.S. Application Data

(60) Provisional application No. 61/290,476, filed on Dec. 28, 2009.

(51) Int. Cl.
*H02B 1/04* (2006.01)

(52) U.S. Cl. ......... 361/624; 361/728; 361/104; 361/147

(58) Field of Classification Search .................. 361/624, 361/643, 728, 104, 147
See application file for complete search history.

(56) References Cited

U.S. PATENT DOCUMENTS

| | | | |
|---|---|---|---|
| 2,030,179 A | 2/1936 | Potter | |
| 3,167,729 A | 1/1965 | Hall | |
| 3,323,083 A | 5/1967 | Ziegler | |
| 3,590,325 A * | 6/1971 | McMillen et al. | 361/92 |
| 3,619,721 A | 11/1971 | Westendorp | |
| 3,663,901 A | 5/1972 | Forney, Jr. | |
| 3,731,234 A | 5/1973 | Collins | |
| 3,750,053 A | 7/1973 | LeDonne | |
| 3,783,178 A | 1/1974 | Philibert et al. | |
| 3,831,110 A | 8/1974 | Eastman | |
| 3,845,358 A | 10/1974 | Anderson et al. | |
| 3,944,937 A | 3/1976 | Fujisawa et al. | |
| 3,980,976 A | 9/1976 | Tadama et al. | |
| 4,046,451 A | 9/1977 | Juds et al. | |
| 4,047,120 A | 9/1977 | Lord et al. | |
| 4,112,395 A | 9/1978 | Seward | |
| 4,262,317 A | 4/1981 | Baumbach | |
| 4,359,764 A | 11/1982 | Block | |
| 4,384,331 A | 5/1983 | Fukuhara et al. | |
| 4,409,637 A | 10/1983 | Block | |
| 4,481,641 A | 11/1984 | Gable et al. | |
| 4,554,608 A | 11/1985 | Block | |
| 4,563,720 A | 1/1986 | Clark | |
| 4,586,104 A | 4/1986 | Standler | |
| 4,689,713 A | 8/1987 | Hourtane et al. | |
| 4,698,721 A | 10/1987 | Warren | |
| 4,727,350 A | 2/1988 | Ohkubo | |

(Continued)

FOREIGN PATENT DOCUMENTS

| | | |
|---|---|---|
| CH | 675933 AS | 11/1990 |
| JP | 11-037400 | 2/1999 |

(Continued)

*Primary Examiner* — Truc Nguyen
(74) *Attorney, Agent, or Firm* — Snell & Wilmer LLP

(57) ABSTRACT

A power distribution device may include an input port configured to receive power form a power source, a plurality of sockets arranged along a first plane to from a matrix, each of the plurality of sockets including first and second terminals, the first terminals coupled to the input port, the first and second terminals of each of the plurality of sockets configured to deliver the power therebetween upon coupling to a connection device, and a plurality of output ports aligned along a second plane, each of the plurality of output ports coupled to the second terminal of one of the plurality of sockets, the plurality of output ports configured to distribute the power to one or more power loads.

20 Claims, 7 Drawing Sheets

U.S. PATENT DOCUMENTS

| | | | | |
|---|---|---|---|---|
| 4,952,173 | A | 8/1990 | Peronnet et al. | |
| 4,984,146 | A | 1/1991 | Black et al. | |
| 4,985,800 | A | 1/1991 | Feldman et al. | |
| 5,053,910 | A | 10/1991 | Goldstein | |
| 5,057,964 | A | 10/1991 | Bender et al. | |
| 5,102,818 | A | 4/1992 | Paschke et al. | |
| 5,122,921 | A | 6/1992 | Koss | |
| 5,124,873 | A | 6/1992 | Wheeler et al. | |
| 5,142,429 | A | 8/1992 | Jaki | |
| 5,166,855 | A | 11/1992 | Turner | |
| 5,278,720 | A | 1/1994 | Bird | |
| 5,321,573 | A | 6/1994 | Person et al. | |
| 5,353,189 | A | 10/1994 | Tomlinson | |
| 5,442,330 | A | 8/1995 | Fuller et al. | |
| 5,537,044 | A | 7/1996 | Stahl | |
| 5,617,284 | A | 4/1997 | Paradise | |
| 5,625,521 | A | 4/1997 | Luu | |
| 5,667,298 | A | 9/1997 | Musil et al. | |
| 5,689,406 | A * | 11/1997 | Wood et al. | 361/796 |
| 5,721,662 | A | 2/1998 | Glaser et al. | |
| 5,781,844 | A | 7/1998 | Spriester et al. | |
| 5,790,361 | A | 8/1998 | Minich | |
| 5,844,766 | A | 12/1998 | Miglioli | |
| 5,854,730 | A | 12/1998 | Mitchell et al. | |
| 5,953,195 | A | 9/1999 | Pagliuca | |
| 5,966,283 | A | 10/1999 | Glaser et al. | |
| 5,982,602 | A | 11/1999 | Tellas et al. | |
| 5,986,869 | A | 11/1999 | Akdag | |
| 6,054,905 | A | 4/2000 | Gresko | |
| 6,060,182 | A | 5/2000 | Tanaka et al. | |
| 6,061,223 | A | 5/2000 | Jones et al. | |
| 6,086,544 | A | 7/2000 | Hibner et al. | |
| 6,115,227 | A | 9/2000 | Jones et al. | |
| 6,137,352 | A | 10/2000 | Germann | |
| 6,141,194 | A | 10/2000 | Maier | |
| 6,177,849 | B1 | 1/2001 | Barsellotti et al. | |
| 6,236,551 | B1 | 5/2001 | Jones et al. | |
| 6,243,247 | B1 | 6/2001 | Akdag et al. | |
| 6,252,755 | B1 | 6/2001 | Willer | |
| 6,281,690 | B1 | 8/2001 | Frey | |
| 6,292,344 | B1 | 9/2001 | Glaser et al. | |
| 6,331,933 | B1 * | 12/2001 | Rumney | 361/622 |
| 6,342,998 | B1 | 1/2002 | Bencivenga et al. | |
| 6,381,283 | B1 | 4/2002 | Bhardwaj et al. | |
| 6,385,030 | B1 | 5/2002 | Beene | |
| 6,394,122 | B1 | 5/2002 | Sibley et al. | |
| 6,421,220 | B2 | 7/2002 | Kobsa | |
| 6,502,599 | B1 | 1/2003 | Sibley et al. | |
| 6,527,004 | B1 | 3/2003 | Sibley et al. | |
| 6,707,256 | B2 * | 3/2004 | Suomi et al. | 315/112 |
| 6,719,149 | B2 * | 4/2004 | Tomino | 211/26 |
| 6,721,155 | B2 | 4/2004 | Ryman | |
| 6,754,060 | B2 | 6/2004 | Kauffman | |
| 6,757,152 | B2 | 6/2004 | Galvagni et al. | |
| 6,785,110 | B2 | 8/2004 | Bartel et al. | |
| 6,789,560 | B1 | 9/2004 | Sibley et al. | |
| 6,814,100 | B1 | 11/2004 | Sibley et al. | |
| 6,968,852 | B1 | 11/2005 | Sibley | |
| 6,975,496 | B2 | 12/2005 | Jones et al. | |
| 7,082,022 | B2 | 7/2006 | Bishop | |
| 7,104,282 | B2 | 9/2006 | Hooker et al. | |
| 7,106,572 | B1 | 9/2006 | Girard | |
| 7,126,803 | B2 * | 10/2006 | Schomaker et al. | 361/103 |
| 7,130,103 | B2 | 10/2006 | Murata | |
| 7,159,236 | B2 | 1/2007 | Abe et al. | |
| 7,190,093 | B2 * | 3/2007 | Bet et al. | 307/147 |
| 7,221,550 | B2 | 5/2007 | Chang et al. | |
| 7,250,829 | B2 | 7/2007 | Namura | |
| 7,430,103 | B2 | 9/2008 | Kato | |
| 7,554,796 | B2 * | 6/2009 | Coffey et al. | 361/643 |
| 7,623,332 | B2 | 11/2009 | Frank et al. | |
| 7,808,752 | B2 | 10/2010 | Richiuso et al. | |
| 7,839,623 | B2 * | 11/2010 | Coffey et al. | 361/624 |
| 2002/0167302 | A1 | 11/2002 | Gallavan | |
| 2002/0191360 | A1 | 12/2002 | Colombo et al. | |
| 2003/0072121 | A1 | 4/2003 | Bartel et al. | |
| 2003/0211782 | A1 | 11/2003 | Esparaz et al. | |
| 2004/0121648 | A1 | 6/2004 | Voros | |
| 2004/0145849 | A1 | 7/2004 | Chang et al. | |
| 2004/0264087 | A1 | 12/2004 | Bishop | |
| 2005/0036262 | A1 | 2/2005 | Siebenthall et al. | |
| 2005/0044858 | A1 | 3/2005 | Hooker et al. | |
| 2005/0176275 | A1 | 8/2005 | Hoopes et al. | |
| 2005/0185354 | A1 | 8/2005 | Hoopes | |
| 2006/0146458 | A1 | 7/2006 | Mueller | |
| 2007/0053130 | A1 | 3/2007 | Harwath | |
| 2007/0139850 | A1 | 6/2007 | Kamel et al. | |
| 2009/0103226 | A1 | 4/2009 | Penwell et al. | |
| 2009/0109584 | A1 | 4/2009 | Jones et al. | |
| 2009/0284888 | A1 | 11/2009 | Bartel et al. | |
| 2011/0080683 | A1 | 4/2011 | Jones et al. | |
| 2011/0141646 | A1 | 6/2011 | Jones et al. | |
| 2011/0159727 | A1 | 6/2011 | Howard et al. | |

FOREIGN PATENT DOCUMENTS

| | | |
|---|---|---|
| KR | 1020090018497 | 2/2009 |
| WO | WO 9510116 | 4/1995 |
| WO | PCT/US03/17050 | 5/2003 |
| WO | WO 2011-119723 | 12/2011 |

* cited by examiner

POWER DISTRIBUTION DEVICE

CLAIM OF PRIORITY UNDER 35 U.S.C. §119

The present application for patent claims priority to and the benefit of U.S. Provisional Application No. 61/290,476, entitled "HIGH DENSITY DC POWER DISTRIBUTION AND PROTECTION CHASSIS," filed Dec. 28, 2009, and assigned to the assignee hereof and hereby expressly incorporated by reference herein.

BACKGROUND

1. Field

The present invention generally relates to the field of power electronics, and more particularly to a power distribution device.

2. Description of the Related Art

A power distribution device may distribute power received from a power source to various power loads, such as a computer, a web server, a router, a switch, a transceiver, and/or other telecommunication devices. Generally, a power distribution device may be stored on a rack. The rack may station the various power loads to which the power distribution device may distribute power. Different power loads may have different power consumption levels. For example, a web server may operate at a higher current level than a computer. In another example, a transceiver may operate at a higher voltage level than a router. Moreover, different power loads may adopt different circuit protection mechanisms, which may include, but are not limited to, fuses and circuit breakers.

Many power distribution devices may be limited to lower-rated power (e.g., 150-200 amperes of total input power). Using multiple lower-rated power distribution devices may potentially improve safety and provide more protection to the power loads. However, multiple lower-rated power distribution devices take up valuable rack space, which may preferably be used for storing other electronic devices.

Some power distribution devices may be pre-configured at the factory such that they may not support the installation of post-manufacturing circuit protection devices, such as circuit breakers and telecom fused disconnects (TFD). Moreover, these power distribution devices may not support the simultaneous installation of various circuit protection devices. Hence, installing circuit protection devices to these power distribution device may be difficult and inefficient.

Thus, there is a need for a power distribution device with improved qualities.

SUMMARY

In one embodiment, the present invention may provide a power distribution device, which may include an input port configured to receive power form a power source, a plurality of sockets arranged along a first plane to form a matrix, each of the plurality of sockets including first and second terminals, the first terminals coupled to the input port, the first and second terminals of each of the plurality of sockets configured to deliver the power therebetween upon coupling to a connection device, and a plurality of output ports aligned along a second plane, each of the plurality of output ports coupled to the second terminal of one of the plurality of sockets, the plurality of output ports configured to distribute the power to one or more power loads.

In another embodiment, the present invention may include a power distribution device, which may include a housing defining a first horizontal space and a second horizontal space positioned above the first horizontal space, the housing having a first end and a second end opposing the first end, a first socket disposed along the first end and within the first horizontal space, the first socket having first and second terminals, a second socket disposed along the first end and within the second horizontal space, the second socket having first and second terminals, an input port coupled to the first terminals of the first and second sockets, a first output port disposed along the second end, the first output port coupled to the second terminal of the first socket, and a second output port disposed along the second end and adjacent to the first output port, the second output port coupled to the second terminal of the first socket.

In yet another embodiment, the present invention may provide a power distribution device, which may include a first socket having first and second terminals, a second socket vertically aligned with the first socket, the second socket having first and second terminals, an input bus coupled to the first terminals of the first and second sockets, an input port coupled to the input bus, a first output bus having front and back portions, the front portion coupled to the second terminal of the first socket, a first output port coupled to the back portion of the first output bus, a second output bus having front and back portions, the front portion coupled to the second terminal of the second socket, the front portion of the second output bus vertically aligned with the front portion of the first output bus, and a second output port horizontally aligned with the first output port, the second output port coupled to the back portion of the second output bus.

This summary is provided merely to introduce certain concepts and not to identify any key or essential features of the claimed subject matter.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Apparatus, systems and methods that implement the embodiment of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between reference elements. In addition, the first digit of each reference number indicates the figure in which the element first appears.

Figure 1A:
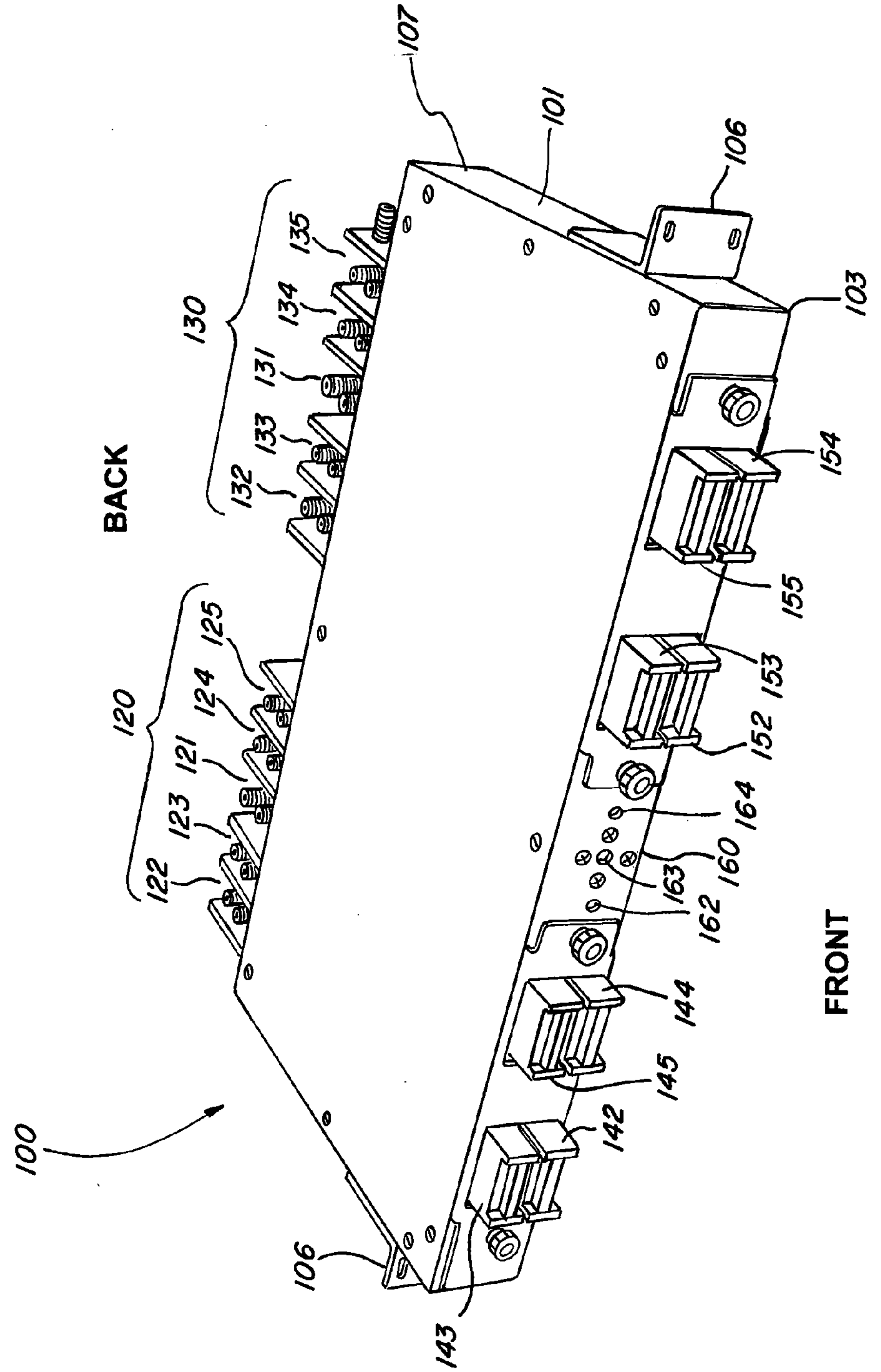
FIG. 1A shows a perspective front view of a power distribution device according to an embodiment of the present invention.

FIG. 1A shows a perspective front view of a power distribution device 100 according to an embodiment of the present invention. The power distribution device 100 may include a housing 101 having a front end 103 and a back end 107. The front end 103 may align with a first (front) plane, and the back end 107 may align with a second (back) plane, which may be parallel to the front plane. Power cables (not shown) may be connected to various ports located at the back end 107. Connection devices 142, 143, 144, 145, 152, 153, 154, and 155 may be plugged into various sockets (not shown) located at the front end 103 of the housing 101. The power distribution device 100 may have a pair of bracket holders 106, which may be used for securing the power distribution device 100 to a rack (not shown). The power distribution device 100 may receive DC and/or AC power from one or more power sources, and it may distribute the received power to various power loads (not shown). The various power loads may be any electronic equipment, such as a mainframe computer, a server, a router, a switch, and/or other telecommunication devices.

The power distribution device 100 may include one or more power distribution bays, which may be located at the back end 107. For example, the power distribution device 100 may include a first (right) power distribution bay 120 and a second (left) power distribution bay 130. Each of the first 120 and second 130 power distribution bays may distribute power from a single power source to multiple power loads.

The first power distribution bay 120 may include a first input port 121, a first output port 122, a second output port 123, a third output port 124, and a fourth output port 125. The first input port 121 may be coupled to a first power source (not shown) for receiving a first current (not shown). The first 122, second 123, third 124, and fourth 125 output ports may be coupled to one or more power loads, and they may deliver the first current to the power loads.

The second power distribution bay 130 may include a second input port 131, a fifth output port 132, a sixth output port 133, a seventh output port 134, and an eighth output port 135. The second input port 131 may be coupled to a second power source (not shown) for receiving a second current (not shown). The fifth 132, sixth 133, seventh 134, and eighth 135 output ports may be coupled to one or more power loads, and they may deliver the second current to the power loads.

In one embodiment, the first power distribution bay 120 may be isolated from the second power distribution bay 130. The first power distribution bay 120 may distribute power to a first group of power loads (not shown). The second power distribution bay 130 may distribute power to a second group of power loads (not shown), which may have a different power consumption level than the first group of power loads. As such, the power distribution device 100 may distribute power to a group of power loads (not shown) with a low power consumption level and to another group of power loads (not shown) with a high power consumption level.

The power distribution device 100 may distribute power with a wide voltage range and/or a wide current range. In one embodiment, for example, the power distribution device 100 may have a DC voltage range, which may range from about +/−24 V to about +/−48 V. In another embodiment, for example, the power distribution device 100 may have a current range, which may range from about 50 A to about 500 A.

To establish the coupling between the first input port 121 and the output ports 122, 123, 124, and 125, the power distribution device 100 may receive one or more connection devices at the front end 103. In one example, a first connection device 142 may couple the first input port 121 with the first output port 122, thereby allowing power to be distributed from the first input port 121 to the first output port 122. In another example, a second connection device 143 may couple the first input port 121 with the second output port 123, thereby allowing power to be distributed from the first input port 121 to the second output port 123. In another example, a third connection device 144 may couple the first input port 121 with the third output port 124, thereby allowing power to be distributed from the first input port 121 to the third output port 124. In another example, a fourth connection device 145 may couple the first input port 121 with the fourth output port 125, thereby allowing power to be distributed from the first input port 121 to the fourth output port 125.

Similarly, the power distribution device 100 may receive one or more connection devices at the front end 103 to establish the coupling between the second input port 131 and the output ports 132, 133, 134, and 135. In one example, a fifth connection device 152 may couple the second input port 131 with the fifth output port 132, thereby allowing power to be distributed from the second input port 131 to the fifth output port 132. In another example, a sixth connection device 153 may couple the second input port 131 with the sixth output port 133, thereby allowing power to be distributed from the second input port 131 to the sixth output port 133. In another example, a seventh connection device 154 may couple the second input port 131 with the seventh output port 134, thereby allowing power to be distributed from the second input port 131 to the seventh output port 134. In another example, an eighth connection device 155 may couple the second input port 131 with the eighth output port 135, thereby allowing power to be distributed from the second input port 131 to the eight output port 135.

Figure 1B:
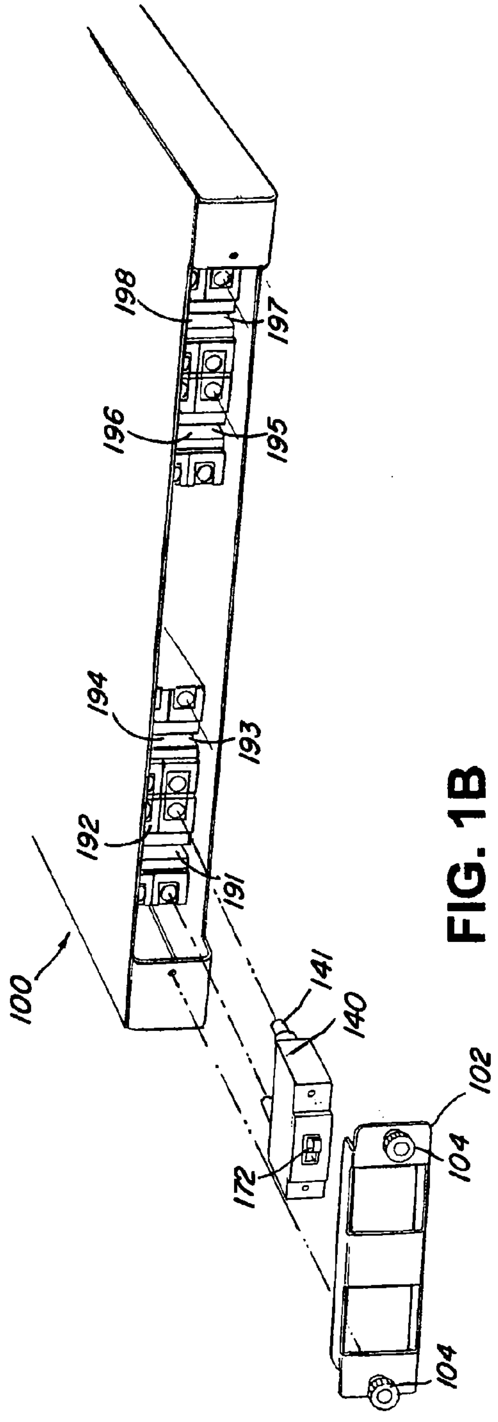
FIG. 1B shows an exploded view of a circuit breaker being plugged into a socket of the power distribution device according to an embodiment of the present invention.
Figure 1C:
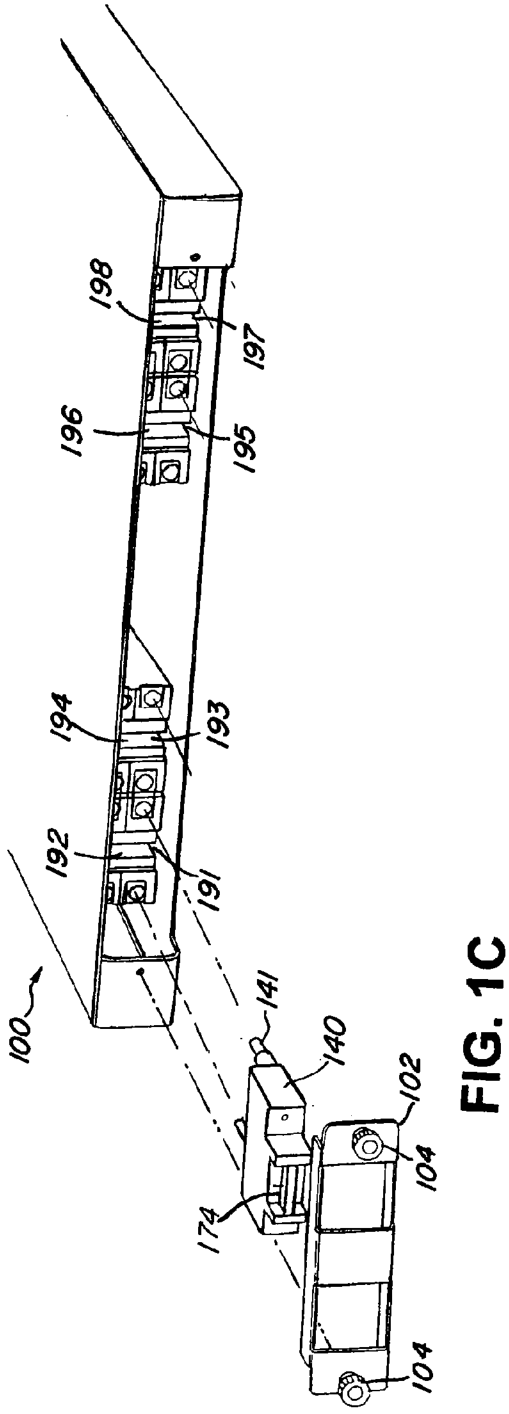
FIG. 1C shows an exploded view of a telecom fused disconnect (TFD) being plugged into the socket of the power distribution device according to an embodiment of the present invention.

As shown in FIGS. 1B and 1C, the power distribution device 100 may have one or more sockets, such as first 191, second 192, third 193, fourth 194, fifth 195, sixth 196, seventh 197, and eighth 198 sockets, positioned along the front end 103. The first 191, second 192, third 193, fourth 194, fifth 195, sixth 196, seventh 197, and eighth 198 sockets may each receive a connection devices 140, which can be one or more of the connection devices 142, 143, 144, 145, 152, 153, 154, and 155 as shown in FIG. 1A.

The first socket 191 may correspond to an open circuit between the first input port 121 and the first output port 122. The second socket 192 may correspond to an open circuit between the first input port 121 and the second output port 123. The third socket 193 may correspond to an open circuit between the first input port 121 and the third output port 124. The fourth socket 194 may correspond to an open circuit between the first input port 121 and the fourth output port 125.

The fifth socket 195 may correspond to an open circuit between the second input port 131 and the fifth output port 132. The sixth socket 196 may correspond to an open circuit between the second input port 131 and the sixth output port 133. The seventh socket 197 may correspond to an open circuit between the second input port 131 and the seventh output port 134. The eighth socket 198 may correspond to an open circuit between the second input port 131 and the eighth output port 135.

After being plugged into the first socket 191, the connection device 140 may, for example, close the open circuit between the first input port 121 and the first output port 122. The connection device 140 may have a pair of pins 141, which may be inserted into the first socket 191. In one embodiment, the power distribution device 100 may include a securing mechanism for preventing the connection device 140 from falling off from one of the first 191, second 192, third 193, fourth 194, fifth 195, sixth 196, seventh 197, and/or eighth 198 sockets. For example, the power distribution device 100 may include a guard plate 102 and a pair of screws 104. The guard plate 104 may hold the connection device 140 in place when the pair of screws 104 secures the guard plate 104 to the front end 103 of the power distribution device 100.

The connection device 140 may incorporate a circuit monitoring device and/or a circuit protection device. A circuit monitoring device may monitor and/or analyze the power consumption of a power load that receives power from one or more of the output ports (e.g., output ports 122, 123, 124, 125, 132, 133, 134, and 135). A circuit protection device may be a device that can protect an electronic component (not shown) of the power load from an electrical or electronic interrupt, sudden voltage surge and/or sudden current surge.

Referring to FIG. 1B, for example, a circuit protection device may be a circuit breaker 172 according to an embodiment of the present invention. The circuit breaker 172 may include a circuit break handle, which may allow a user to manually break open the coupling between an input port (e.g., input port 121 or 131) and one of the output ports (e.g., output ports 122, 123, 124, 125, 132, 134, 133, 134, and 135). In a situation where the user decides to cut off power supply to a particular output port, the user may flip the circuit break handle from a close position to an open position.

Referring to FIG. 1C, for example, a circuit protection device may be a fuse, such as a telecom fuse disconnect (TFD) 174. The TFD 174 may provide a conductor for conducting a current between one of the input ports (e.g., input ports 121 and 131) and one or more of the output ports (e.g., output ports 122, 123, 124, 125, 132, 133, 134, and 135). When the current exceeds a predefined threshold, the conductor of the TFD 174 may be damaged or destroyed. As such, the TFD 174 may stop conducting the current to protect an electronic component of a power load from a sudden current surge.

The power distribution device 100 is hot-swappable. That is, the power distribution device 100 may allow various types of circuit monitoring devices and/or circuit protection devices to be installed and removed without interrupting the power distribution of other uninvolved power distribution channels. For example, a power distribution channel established between the first input port 121 and the second output port 123 may be free from interruption even when the first connection device 142 is being replaced.

To enhance spatial efficiency, the first 191, second 192, third 193, and fourth 194 sockets may be arranged to form a two-by-two matrix along the front end 103 of the power distribution device 100. The two-by-two matrix may have a first (left) column, in which the second socket 192 may be stacked against the first socket 191, and a second (right) column, in which the fourth socket 194 may be stacked against the third socket 193. The two-by-two matrix may have a first (bottom) row and a second (top) row. The first row may include the first 191 and the third 193 sockets, and the second row may include the second 192 and the fourth 194 sockets. Arranging the sockets in the two-by-two matrix may allow the power distribution device 100 to include a larger number of sockets in a relatively small area.

The power distribution device 100 may arrange six or more sockets to form various matrices. In one embodiment, for example, the power distribution device 100 may arrange six sockets in a two-by-three matrix and/or a three-by-two matrix. In another embodiment, for example, the power distribution device 100 may arrange eight sockets in a two-by-four matrix and/or a four-by-two matrix. In another embodiment, for example, the power distribution device 100 may arrange ten sockets in a two-by-five matrix and/or a five-by-two matrix.

Referring again to FIG. 1A, the power distribution device 100 may have a display panel 160, which may include a first power distribution indicator 162, a second power distribution indicator 164, and an alarm indicator 163. The first power distribution indicator 162 may indicate whether the first 122, second 123, third 124, and/or fourth 125 output ports are delivering power received from the first input port 121. The second power distribution indicator 164 may indicate whether the fifth 132, sixth 133, seventh 134, and eighth 135 output ports are delivering power received from the second input port 131. In one embodiment, the alarm indicator 163 may indicate that one or more connection devices 142, 143, 144, 145, 152, 153, 154, and/or 155 may stop conducting current. If the connection device incorporates a fuse 174, the alarm indicator 163 may indicate that the fuse is blown. If the connection device incorporates a circuit breaker 172, the alarm indicator 163 may indicate that the circuit is broken. In another embodiment, the alarm indicator 164 may indicate that one or more of the output ports 122, 123, 124, 125, 132, 133, 134, and/or 135 are under an electrical or electronic interrupt, sudden voltage surge and/or sudden current surge.

Figure 2:
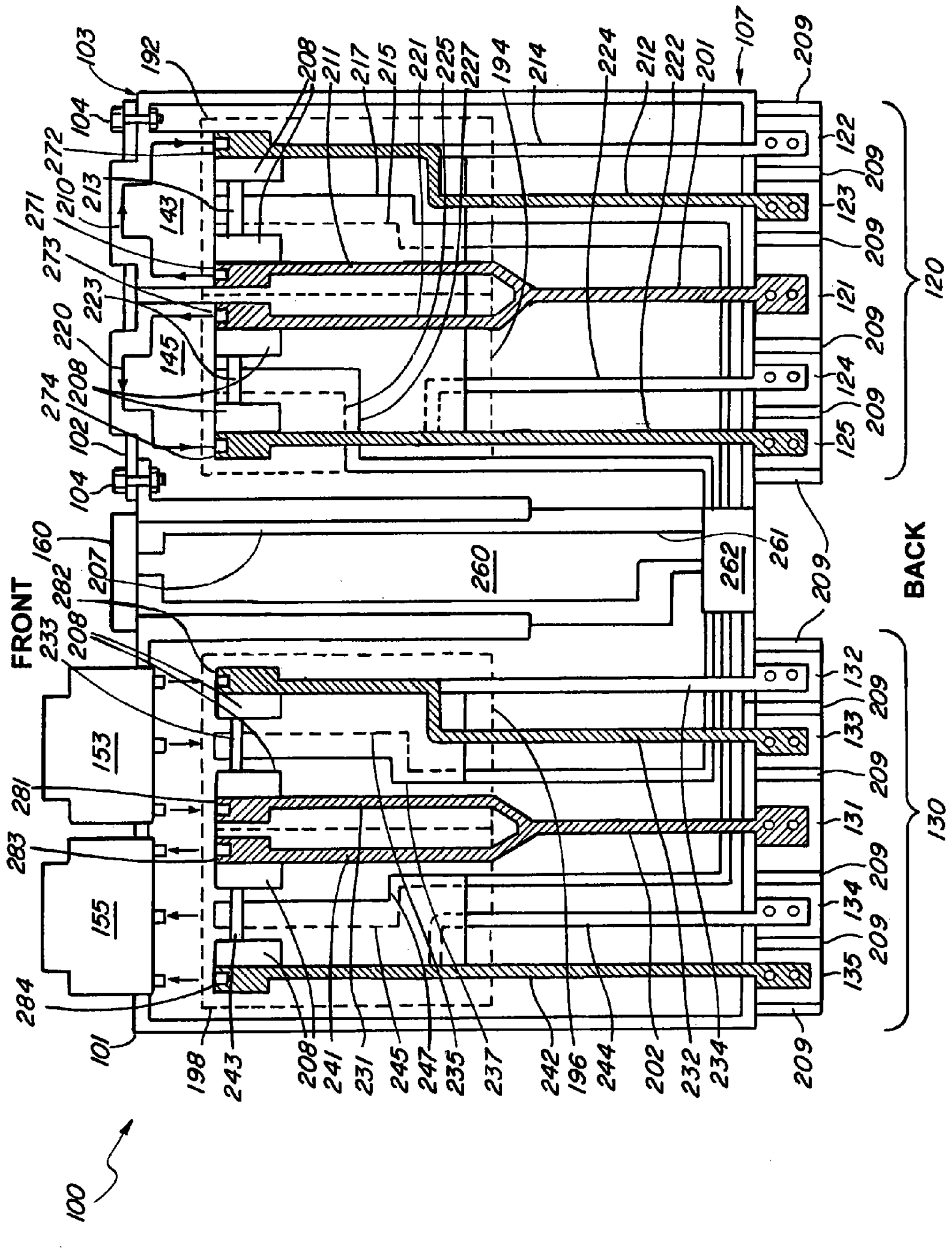
FIG. 2 shows a schematic top view of a power distribution device according to an embodiment of the present invention.

FIG. 2 shows a schematic top view of a power distribution device 100 according to an embodiment of the present invention. The first 120 and the second 130 power distribution bays may spread across the back end 107 of the power distribution device 100. Along the first power distribution bay 120, the second output port 123 may be positioned between the first output port 122 and the first input port 121, and the third output port 124 may be positioned between the first input port 121 and the fourth output port 125. Along the second power distribution bay 130, the sixth output port 133 may be positioned between the fifth output port 132 and the second input port 131, and the seventh output port 134 may be positioned between the second input port 131 and the eighth output port 135. The power distribution device 100 may include six insulating plates 209 for each of the first 120 and the second 130 power distribution bays. The insulating plates 209 may be inserted between adjacent ports, so as to prevent or minimize interference among the output ports and the input ports.

In one embodiment, each port of the first power distribution bay 120 may be coupled to one power bus. The first input port 121 may be coupled to a first input bus 201. The first output port 122 may be coupled to a first output bus 214. The second output port 123 may be coupled to a second output bus 212. The third output port 124 may be coupled to a third output bus 224. The fourth output port 125 may be coupled to a fourth output bus 222.

In another embodiment, each port of the second power distribution bay 130 may be coupled to one power bus. The second input port 131 may be coupled to a second input bus 202. The fifth output port 132 may be coupled to a fifth output bus 234. The sixth output port 133 may be coupled to a sixth output bus 232. The seventh output port 134 may be coupled to a sixth output bus 244. The eighth output port 135 may be coupled to an eighth output bus 242.

The housing 101 may define a first (bottom) horizontal space and a second (top) horizontal space across the power distribution device 100. Half of the sockets may be disposed within the first horizontal space, while the other half of the sockets may be disposed within the second horizontal space. In one embodiment, for example, the first 191, third 193, fifth 195, and seventh 197 sockets may be disposed within the first (bottom) horizontal space, while the second 192, fourth 194, sixth 196, and eighth 198 sockets may be disposed within the second (top) horizontal space. In an alternative embodiment, for example, the first 191, third 193, fifth 195, and seventh 197 sockets may be disposed within the second (top) horizontal space, while the second 192, fourth 194, sixth 196, and eighth 198 sockets may be disposed within the first (bottom) horizontal space.

FIG. 2 shows the top schematic view of the power distribution device 100, in which the second (top) horizontal space may be predominantly illustrated. As such, the second 192, fourth 194, sixth 196, and the eighth 198 sockets may be discussed accordingly.

The second socket 192 may include a first terminal 271 and a second terminal 272. The first terminal 271 may be coupled to the first input port 121 via a first prong 211 of the first input bus 201. The second terminal 272 may be coupled to the second output port 123 via the second output bus 212. When the second connection device 143 is plugged into the second socket 192, a coupling may be established between the first 271 and the second 272 terminals. A second current 210 may flow between the first input port 121 and the second output port 123. As such, power may be distributed from a first power source (not shown), which may be coupled to the first input port 121, to a power load, which may be coupled to the second output port 123.

The fourth socket 194 may include a first terminal 273 and a second terminal 274. The first terminal 273 may be coupled to the first input port 121 via a second prong 221 of the first input bus 201. The second terminal 274 may be coupled to the fourth output port 125 via the fourth output bus 222. When the fourth connection device 145 is plugged into the fourth socket 194, a coupling may be established between the first 273 and the second 274 terminals. A fourth current 220 may flow between the first input port 121 and the fourth output port 125. As such, power may be distributed from a first power source (not shown), which may be coupled to the first input port 121, to a power load, which may be coupled to the fourth output port 125.

The first socket 191 may be positioned below the second socket 192. The first socket 191 may have similar structure as the second socket 192. For example, the first socket 191 may include first and second terminals (not shown). The first terminal may be coupled to the first input port 121 via the first prong 211 of the first input bus 201. The second terminal may be coupled to the first output port 122 via the first output bus 214.

The third socket 193 may be positioned below the fourth socket 194. The third socket 193 may have similar structure as the fourth socket 194. For example, the third socket 193 may include first and second terminals (not shown). The first terminal may be coupled to the first input port 121 via the second prong 221 of the first input bus 201. The second terminal may be coupled to the third output port 124 via the third output bus 224.

Figure 3:
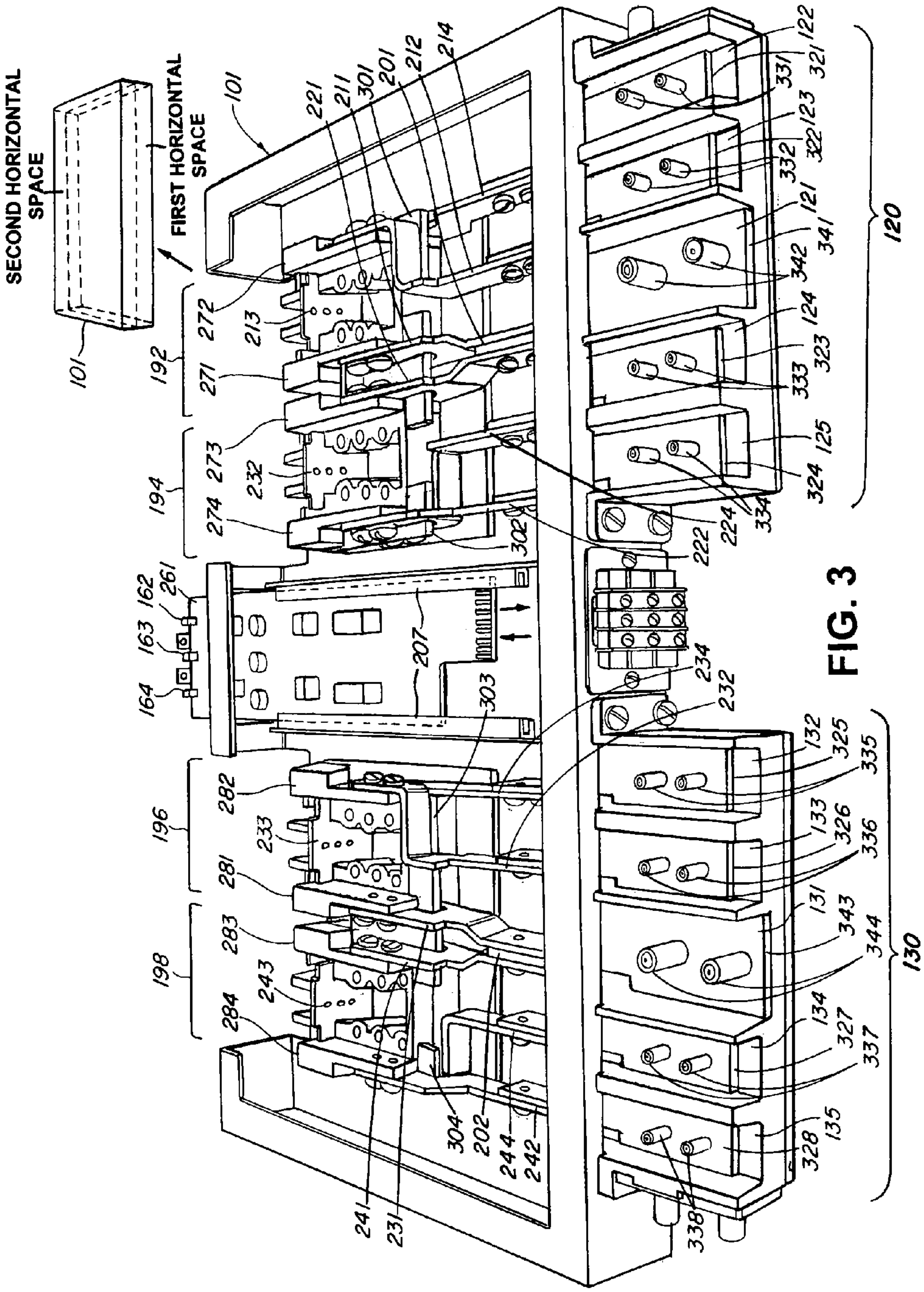
FIG. 3 shows a perspective back view of an exposed power distribution device according to an embodiment of the present invention.

In order to allow the second socket 192 to stack against the first socket 191, part of the first output bus 214 may share a vertical space with part of the second output bus 212. Referring to FIG. 3, for example, the first output bus 214 may be routed downward to the first (bottom) horizontal space, while the second output bus 212 may be routed rightward and upward to the second (top) horizontal space. Similarly, in order to allow the fourth socket 194 to stack against the third socket 193, part of the third output bus 224 may share a vertical space with part of the fourth output bus 222. For example, the third output bus 224 may be routed leftward and downward to the first (bottom) horizontal space, while the fourth output bus 222 may be routed upward to the second (top) horizontal space.

The fifth 195, sixth 196, seventh 197, and eighth 198 sockets may have a similar topology as the first 191, second 192, third 193, and fourth 194 sockets. For example, the fifth 195 and seventh 197 sockets may occupy the first (bottom) horizontal space, while the sixth 196 and eighth 198 sockets may occupy the second (top) horizontal space.

The fifth socket 195 may include first and second terminals (not shown). The first terminal may be coupled to the second input port 131 via a first prong 231 of the second input bus 202. The second terminal may be coupled to the fifth output port 132 via the fifth output bus 234.

The sixth socket 196 may include first 281 and second 282 terminals. The first terminal 281 may be coupled to the second input port 131 via the first prong 231 of the second input bus 202. The second terminal 282 may be coupled to the sixth output port 133 via the sixth output bus 232.

The seventh socket 197 may include first and second terminals (not shown). The first terminal may be coupled to the second input port 131 via a second prong 241 of the second input bus 202. The second terminal may be coupled to the seventh output port 134 via the seventh output bus 244.

The eighth socket 198 may include first 283 and second 284 terminals. The first terminal 283 may be coupled to the second input port 131 via the second prong 241 of the second input bus 202. The second terminal 284 may be coupled to the eighth output port 135 via the eighth output bus 242.

In order to allow the sixth socket 196 to stack against the fifth socket 195, part of the fifth output bus 234 may share a vertical space with part of the sixth output bus 232. Referring to FIG. 3, for example, the fifth output bus 234 may be routed downward to the first (bottom) horizontal space, while the sixth output bus 232 may be routed rightward and upward to the second (top) horizontal space. Similarly, in order to allow the eighth socket 198 to stack against the seventh socket 197, part of the seventh output bus 244 may share a vertical space with part of the eighth output bus 242. For example, the seventh output bus 244 may be routed leftward and downward to the first (bottom) horizontal space, while the eighth output bus 242 may be routed upward to the second (top) horizontal space.

According to an embodiment of the present invention, each of the sockets (e.g., the first 191, second 192, third 193, fourth 194, fifth 195, sixth 196, seventh 197, and eighth 198 sockets) may be independent from the other sockets. As such, each of the sockets may be plugged or unplugged when other sockets are actively distributing power.

Referring again to FIG. 2, for example, the first terminal 281 may be isolated from the second terminal 282 before the sixth connection device 153 is plugged into the sixth socket 196. As such, the sixth output port 133 may be free from receiving any current from the second input port 131. Because the sixth socket 196 is independent from the other sockets, the sixth connection device 153 may be plugged into the sixth socket 196 to establish a coupling between the first 281 and the second 282 terminals regardless whether the fifth socket 195 is plugged or not.

In another example, when the eighth connection device 155 becomes disconnected or inactivated, it may be unplugged from the eighth socket 198. Because the eighth socket 198 is independent from the other sockets, the eighth connection device 155 may be unplugged from the eighth socket 198 regardless whether the seventh socket 197 is plugged or not.

According to an embodiment of the present invention, the power distribution device 100 may have a power monitoring subsystem. Generally, the power monitoring subsystem may include the display panel 160, a monitoring circuit 260 implemented on a printed circuit board (PCB) 261, a hub 262, four probing PCBs 213, 223, 233, and 243, and eight probing wires 215, 217, 225, 227, 235, 237, 245, and 247.

The power distribution device 100 may include four pairs of securing devices 208. Each pair of securing devices may be used for securing one of the four probing PCBs 213, 223, 233, and 243. A first probing PCB 213 may be secured within the first 191 and the second 192 sockets. The first probing PCB 213 may be coupled to the first 142 and the second 143 connection devices when they are plugged into the respective first 191 and second 192 sockets. Also, the first probing PCB 213 may be connected to the hub 262 via the first 215 and the second 217 probing wires. The first probing wire 215 may carry a signal related to the condition of the first connection device 142. The second probing wire 217 may carry a signal related to the condition of the second connection device 143.

A second probing PCB 223 may be secured within the third 193 and the fourth 194 sockets. As such, the second probing PCB 223 may be coupled to the third 144 and the fourth 145 connection devices when they are plugged into the respective third 193 and the fourth 194 sockets. Also, the second probing PCB 223 may be connected to the hub 262 via the third 225 and the fourth 227 probing wires. The third probing wire 225 may carry a signal related to the condition of the third connection device 144. The fourth probing wire 227 may carry a signal related to the condition of the fourth connection device 145.

A third probing PCB 233 may be secured within the fifth 195 and the sixth 196 sockets. As such, the third probing PCB 233 may be coupled to the fifth 152 and the sixth 153 connection devices when they are plugged into the respective fifth 195 and sixth 196 sockets. Also, the third probing PCB 233 may be connected to hub 262 via the fifth 235 and sixth 237 probing wires. The fifth probing wire 235 may carry a signal related to the condition of the fifth connection device 152. The sixth probing wire 237 may carry a signal related to the condition of the sixth connection device 153.

A fourth probing PCB 243 may be secured within the seventh 197 and the eighth 198 sockets. As such, the fourth probing PCB 243 may be coupled to the seventh 154 and the eighth 155 connection devices when they are plugged into the respective seventh 197 and the eighth 198 sockets. Also, the fourth probing PCB 243 may be connected to the hub 262 via the seventh 245 and the eighth 247 probing wires. The fourth probing wire 245 may carry a signal related to the condition of the seventh connection device 154. The eighth probing wire 247 may carry a signal related to the condition of the eighth connection device 155.

The hub 262 may transmit the signals carried by the first 215, second 217, third 225, fourth 227, fifth 235, sixth 237, seventh 245, and eighth 247 probing wires to the probing circuit 260 residing on the PCB 261. The monitoring circuit 260 may process these signals and output the processed signals to the display panel 160.

The power distribution device 100 may include a pair of alignment slots 207, which may be used for aligning the PCB 261 with the hub 262. The monitoring circuit 260 may be easily installed and replaced. Referring to FIG. 3, which shows a perspective back view of an exposed power distribution device 100, the monitoring circuit PCB 261 may be inserted into, or slid out of, the pair of alignment slots 207. As such, the power distribution device 100 may incorporate different power monitoring circuits by adopting various monitoring PCBs 261.

The power distribution device 100 may include several insulating plates 312 to separate two vertically stacked buses. A first insulating plate 301 may be inserted between the first 214 and second 212 output buses. A second insulating plate 302 may be inserted between the third 224 and fourth 222 output buses. A third insulating plate 303 may be inserted between the fifth 234 and sixth 232 output buses. A fourth insulating plate 304 may be inserted between the seventh 244 and eighth 242 output buses.

Figure 4:
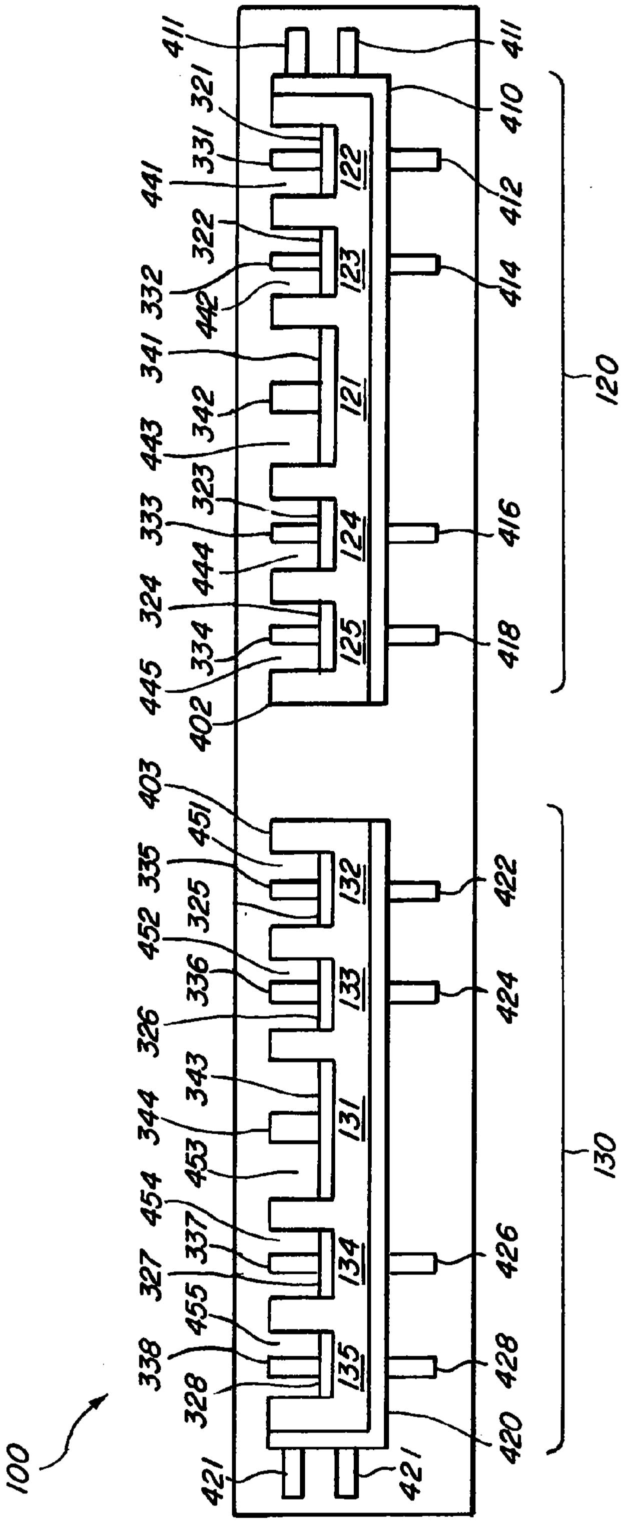
FIG. 4 shows a back side view of a power distribution device according to an embodiment of the present invention.

The discussion now turns to the structural features of the first 120 and second 130 power distribution bays, which may be readily shown in FIGS. 3 and 4. In one embodiment, the first 120 and second 130 power distribution bays may each include an insulating bracket to separate the conducting members of the various input and/or output ports. Generally, each of the output ports may include a forward node and a return node. The forward node may be used for forwarding current from a power source to a power load. The return node may be used for collecting current that returns from the power load. The insulating bracket may serve two functions. First, within a single output port, the insulating bracket may be used for separating the forward node and the return node. Second, among several output ports, the insulating bracket may be used for separating the forward nodes of the several output ports.

The first power distribution bay 120 may, for example, include a first insulating bracket 402. The first insulating bracket 402 may have five valley regions 441, 442, 443, 444, and 445.

The first output port 122 may be positioned about the first valley region 441. The first output port 122 may have a first forward plate 321 and a first forward stud 331 positioned within the first valley region 441. The first forward plate 321 may be coupled to the first output bus 214. The first forward stud 331 may provide a connection point for a first power cable (not shown), which may conduct a first current to a first power load (not shown). Together, the first forward plate 321 and the first forward stud 331 may form a first forward node.

The first output port 122 may include a first return stud 412 positioned under the first valley region 441. The first return stud 412 may collect the first current returning from the first power load. The first return stud 412 may be coupled to a first return plate 410, which may be coupled to a ground source (not shown) via one or more first ground studs 411.

The second output port 123 may be positioned about the second valley region 442. The second output port 123 may have a second forward plate 322 and a second forward stud 332 positioned within the second valley region 442. The second forward plate 322 may be coupled to the second output bus 212. The second forward stud 332 may provide a connection point for a second power cable (not shown), which may conduct a second current to a second power load (not shown). Together, the second forward plate 322 and the second forward stud 332 may form a second forward node.

The second output port 123 may include a second return stud 414 positioned under the second valley region 442. The second return stud 414 may collect the second current returning from the second power load. The second return stud 414 may be coupled to the first return plate 410.

The first input port 121 may be positioned about the third valley region 443. The first input port 121 may have a first input plate 341 and a first input stud 342 positioned within the third valley region 443. The first input stud 342 may provide a connection point for a first power cable (not shown), which may conduct a first input current from a first power source (not shown). The first input plate 341 may be coupled between the first input stud 342 and the first input bus 201. As such, the first input bus 201 may receive the first input current via the first input port 121.

The third output port 124 may be positioned about the fourth valley region 444. The third output port 124 may have a third forward plate 323 and a third forward stud 333 positioned within the fourth valley region 444. The third forward plate 323 may be coupled to the third output bus 224. The third forward stud 333 may provide a connection point for a third power cable (not shown), which may conduct a third current to a third power load (not shown). Together, the third forward plate 323 and the third forward stud 333 may form a third forward node.

The third output port 124 may include a third return stud 416 positioned under the fourth valley region 444. The third return stud 416 may collect the third current returning from the second power load. The third return stud 416 may be coupled to the first return plate 410.

The fourth output port 125 may be positioned about the fifth valley region 445. The fourth output port 125 may have a fourth forward plate 324 and a fourth forward stud 334 positioned within the fifth valley region 445. The fourth forward plate 324 may be coupled to the fourth output bus 222. The fourth forward stud 334 may provide a connection point for a fourth power cable (not shown), which may conduct a fourth current to a fourth power load (not shown). Together, the fourth forward plate 324 and the fourth forward stud 334 may form a fourth forward node.

The fourth output port 125 may include a fourth return stud 418 positioned under the fifth valley region 445. The fourth return stud 418 may collect the fourth current returning from the fourth power load. The fourth return stud 418 may be coupled to the first return plate 410.

The second power distribution bay 130 may, for example, include a second insulating bracket 403. The second insulating bracket 403 may have five valley regions 451, 452, 453, 454, and 455.

The fifth output port 132 may be positioned about the sixth valley region 451. The fifth output port 132 may have a fifth forward plate 325 and a fifth forward stud 335 positioned within the sixth valley region 451. The fifth forward plate 325 may be coupled to the fifth output bus 234. The fifth forward stud 335 may provide a connection point for a fifth power cable (not shown), which may conduct a fifth current to a fifth power load (not shown). Together, the fifth forward plate 325 and the fifth forward stud 335 may form a fifth forward node.

The fifth output port 132 may include a fifth return stud 422 positioned under the sixth valley region 451. The fifth return stud 422 may collect the fifth current returning from the fifth power load. The fifth return stud 422 may be coupled to a second return plate 420, which may be coupled to a ground source (not shown) via one or more second ground studs 421.

The sixth output port 133 may be positioned about the seventh valley region 452. The sixth output port 133 may have a sixth forward plate 326 and a sixth forward stud 336 positioned within the seventh valley region 452. The sixth forward plate 326 may be coupled to the sixth output bus 232. The sixth forward stud 336 may provide a connection point for a sixth power cable (not shown), which may conduct a sixth current to a sixth power load (not shown). Together, the sixth forward plate 326 and the sixth forward stud 336 may form a sixth forward node.

The sixth output port 133 may include a sixth return stud 424 positioned under the seventh valley region 452. The sixth return stud 424 may collect the sixth current returning from the sixth power load. The sixth return stud 424 may be coupled to the second return plate 420.

The second input port 131 may be positioned about the eighth valley region 453. The second input port 131 may have a second input plate 343 and a second input stud 344 positioned within the eighth valley region 453. The second input stud 344 may provide a connection point for a second power cable (not shown), which may conduct a second input current from a second power source (not shown). The second input plate 343 may be coupled between the second input stud 344 and the second input bus 202. As such, the first input bus 202 may receive the second input current via the second input port 131.

The seventh output port 134 may be positioned about the ninth valley region 454. The seventh output port 134 may have a seventh forward plate 327 and a seventh forward stud 337 positioned within the ninth valley region 454. The seventh forward plate 327 may be coupled to the seventh output bus 244. The seventh forward stud 337 may provide a connection point for a seventh power cable (not shown), which may conduct a seventh current to a seventh power load (not shown). Together, the seventh forward plate 327 and the seventh forward stud 337 may form a seventh forward node.

The seventh output port 134 may include a seventh return stud 426 positioned under the ninth valley region 454. The seventh return stud 426 may collect the seventh current returning from the seventh power load. The seventh return stud 426 may be coupled to the second return plate 420.

The eighth output port 135 may be positioned about the tenth valley region 455. The eighth output port 135 may have an eighth forward plate 328 and an eighth forward stud 338 positioned within the tenth valley region 455. The eighth forward plate 328 may be coupled to the eighth output bus 242. The eighth forward stud 338 may provide a connection point for an eighth power cable (not shown), which may conduct an eighth current to an eighth power load (not shown). Together, the eighth forward plate 328 and the eighth forward stud 338 may form an eighth forward node.

The eighth output port 135 may include an eighth return stud 428 positioned under the tenth valley region 455. The eighth return stud 428 may collect the eighth current returning from the eighth power load. The eighth return stud 428 may be coupled to the second return plate 420.

Figure 5:
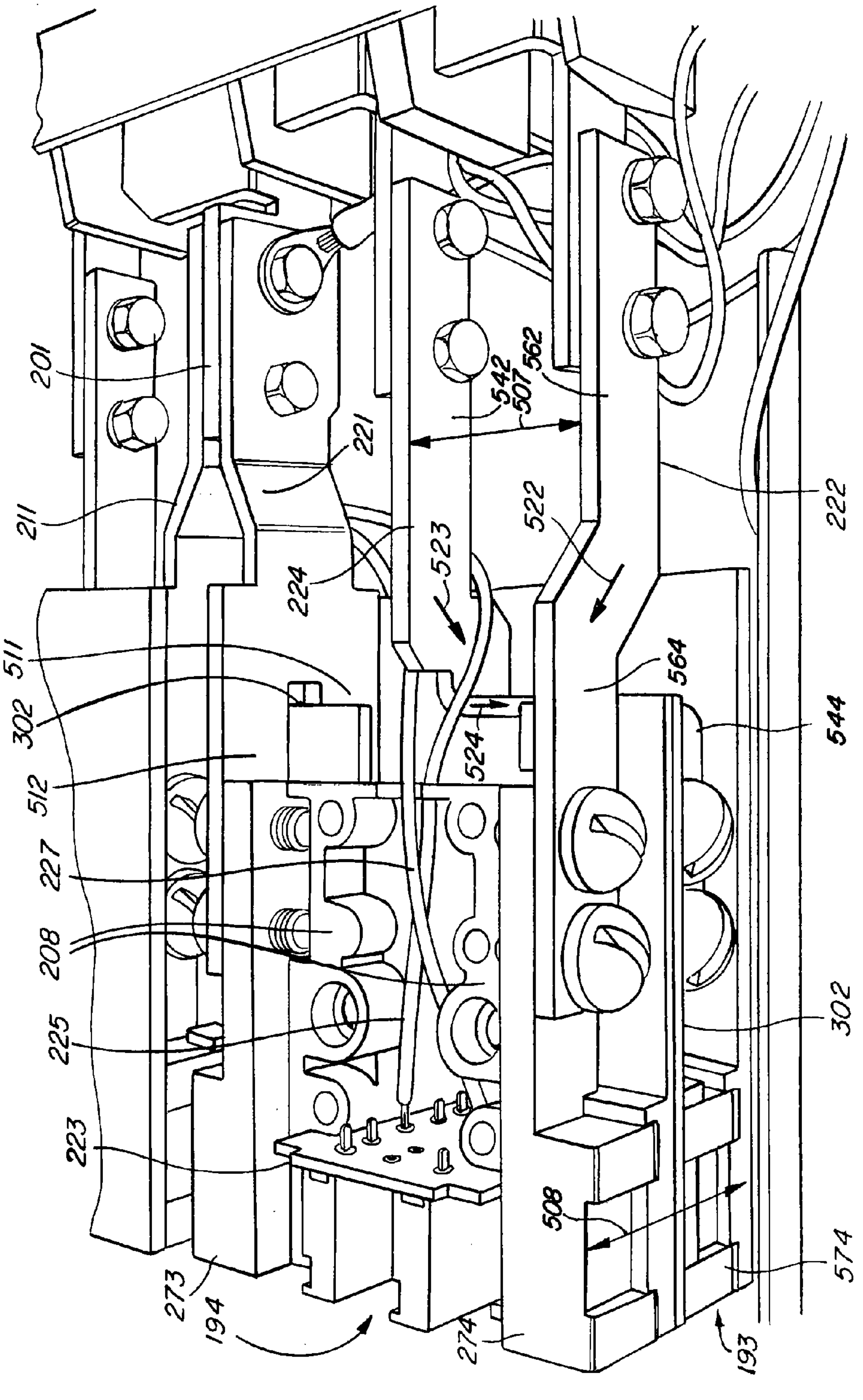
FIG. 5 shows a perspective side view of a pair of vertically stacked sockets according to an embodiment of the present invention.

FIG. 5 shows a perspective side view of a pair of vertically stacked sockets, which may include the third socket 193 and the fourth socket 194. In one embodiment, the third socket 193 may be disposed within a first (bottom) horizontal space while the fourth socket 194 may be disposed within a second (top) horizontal space. In an alternative embodiment, the fourth socket 194 may be disposed within the first horizontal space while the third socket 193 may be disposed within the second horizontal space.

The second insulating plate 302, which is previously shown in FIG. 3, may be inserted between the third 193 and fourth 194 sockets. The pair of securing devices 208 may be made of an insulating material. The pair of securing devices 208 may be used for securing the probing second PCB 223 between the first 273 and the second 274 terminals of the fourth socket 194, and between the first (not shown) and the second 574 terminals of the third socket 193. The second PCB 223 may receive power signals from the third 144 and the fourth 145 connection devices. In return, the second PCB 223 may output the power signals to the third probing wire 225 and the fourth probing wire 227 respectively.

The first input bus 201 may be divided into the first (right) prong 211 and the second (left) prong 212. The second prong 212 may be further divided into a first (bottom) branch 511 and a second (top) branch 512. The first branch 511 may be coupled to the first terminal (not shown) of the third socket 193, while the second branch 512 may be coupled to the first terminal 273 of the fourth socket 194.

The second terminal 574 of the third socket 193 may be coupled to the third output bus 224. To increase spatial efficiency, the third output bus 224 may be routed downward 523 and leftward 524 to meet with the second terminal 574 of the third socket 193. The second terminal 274 of the fourth socket 194 may be coupled to the fourth output bus 222, which may be routed upward 522 to increase spatial efficiency.

In one embodiment, the third output bus 224 may have a first (front) portion 544 and a second (back) portion 542, and the fourth output bus 222 may have a first (front) portion 564 and a second (back) portion 562. Regarding the third output bus 224, the first portion 544 thereof may be coupled to the second terminal 574 of the third socket 193, while the second portion 542 thereof may be coupled to the third output port 124. Regarding the fourth output bus 222, the first portion 564 thereof may be coupled to the second terminal 274 of the fourth socket 194, while the second portion 562 thereof may be coupled to the fourth output port 125.

The first portion 544 of the third output bus 224 may be disposed within a first (bottom) horizontal space, whereas the first portion 564 of the fourth output bus 222 may be disposed within a second (top) horizontal space. Along a vertical axis 508, the first portion 544 of the third output bus 224 may be vertically aligned with the first portion 564 of the fourth output bus 222. Along a horizontal axis 507, the second portion 542 of the third output bus 224 may be horizontally aligned with the second portion 562 of the fourth output bus 222.

The topology of the pair of vertically stacked sockets (e.g., the third 193 and fourth 194 sockets) may be repeated and/or interchanged (e.g., the first 191 and the second 192 sockets) to form an array of vertically stacked sockets. In one embodiment, for example, the power distribution device 100 may include two pairs of vertically stacked sockets. In another embodiment, for example, the power distribution device 100 may include three pairs of vertically stacked sockets. In another embodiment, for example, the power distribution device 100 may include eight pairs of vertically stacked sockets.

Figure 6:
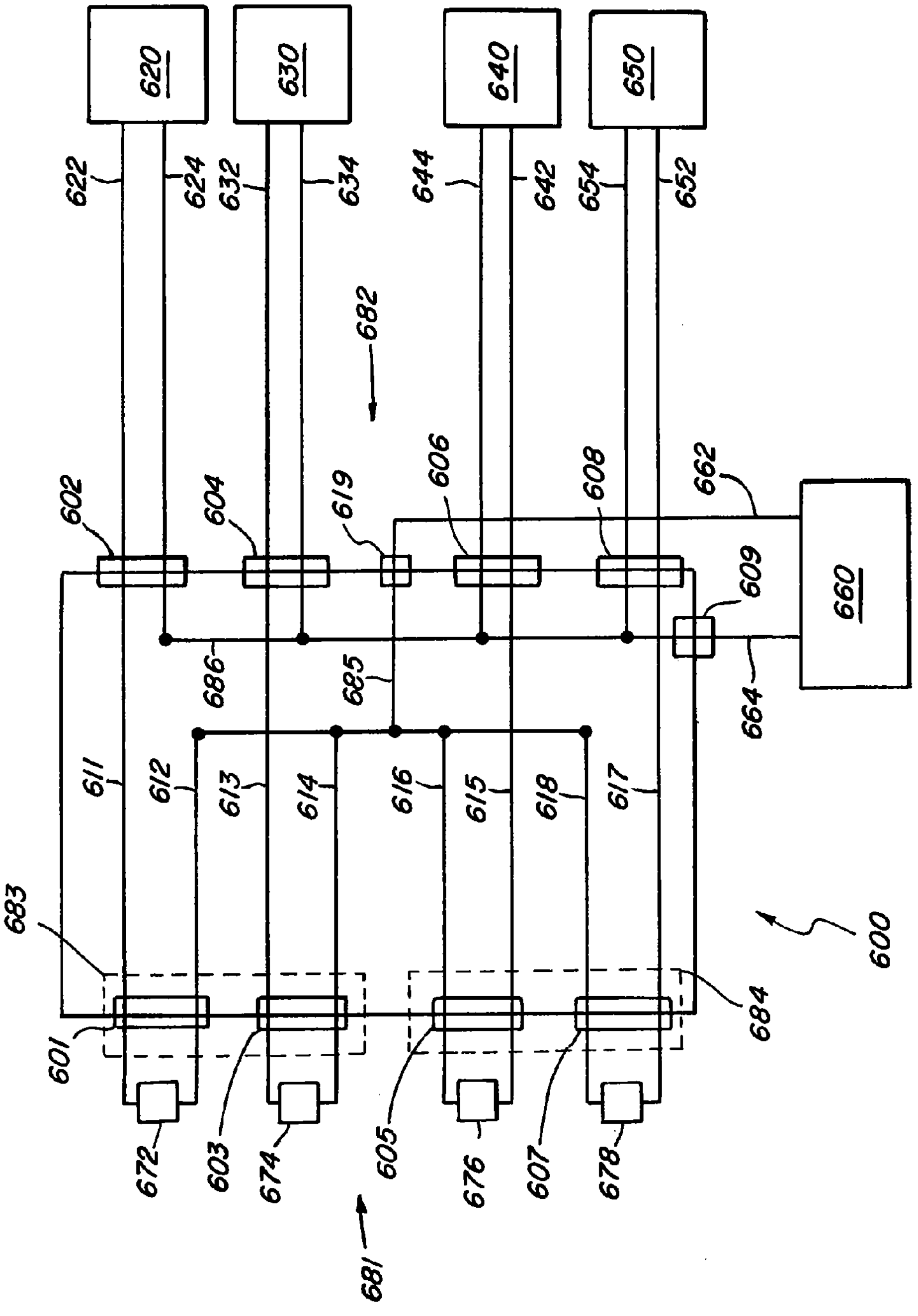
FIG. 6 shows a schematic view of an alternative power distribution device according to an alternative embodiment of the present invention.

FIG. 6 shows a schematic view of an alternative power distribution device 600 according to an alternative embodiment of the present invention. The power distribution device 600 may have a front end 681 and a back end 682. Along the front end 681, the power distribution device 600 may include a first column 683 and a second column 684. The first column 683 may include a first connection port 601 and a second connection port 603, which may be vertically stacked against each other. The second column 684 may include a third connection port 605 and a fourth connection port 607, which may be vertically stacked against each other.

The first 601, second 603, third 605, and fourth 607 connection ports may serve similar functions as the first 191, second 192, third 193, and fourth 194 sockets of the power distribution device 100. For example, the first connection port 601 may be used for receiving a first connection device 672; the second connection port 603 may be used for receiving a second connection device 674; the third connection port 605 may be used for receiving a third connection device 676; and the fourth connection port 607 may be used for receiving a fourth connection device 678.

The first 601, second 603, third 605, and fourth 607 connection ports may be structurally different from the first 191, second 192, third 193, and fourth 194 sockets of the power distribution device 100. For example, the first 601, second 603, third 605, and fourth 607 connection ports may incorporate a plug, a socket, or both. As such, the first 601, second 603, third 605, and fourth 607 connection ports may receiving connecting devices with various mechanical features.

Along the back end 682, the power distribution device 600 may include an input port 619, a first output port 602, a second output port 604, a third output port 606, and a fourth output port 608. The first 602, second 604, third 606, and fourth 608 output ports may be aligned to form a single file. The first 602, second 604, third 606, and fourth 608 output ports may partially protrude from the back end 682 of the power distribution device 600.

A power source 660 may be coupled to the input port 619 via an input power cable 662. The power source 660 may drive an input current into the input port 619, which may be coupled to an input bus 685. The input bus 685 may be divided into four prongs, including a first prong 612, a second prong 614, a third prong 616, and a fourth prong 618. As such, the input current may be distributed among the first 612, second 614, third 616, and fourth 618 prongs. The first prong 612 may pass a first current to a first output bus 611 via the first connection device 672. The second prong 614 may pass a second current to a second output bus 613 via the second connection device 674. The third prong 616 may pass a third current to a third output bus 615 via the third connection device 676. The fourth prong 618 may pass a fourth current to a fourth output bus 617 via the fourth connection device 678.

The first output bus 611 may be coupled to a first output power cable 622 at the first output port 602. The first output power cable 622 may conduct the first current to a first power load 620. The first power load 620 may consume the power carried by the first current, and it may then return the first current to the first output port 602 via a first return cable 624.

The second output bus 613 may be coupled to a second output power cable 632 at the second output port 604. The second output power cable 632 may conduct the second current to a second power load 630. The second power load 630 may consume the power carried by the second current, and it may then return the second current to the second output port 604 via a second return cable 634.

The third output bus 615 may be coupled to a third output power cable 642 at the third output port 606. The third output power cable 642 may conduct the third current to a third power load 640. The third power load 640 may consume the power carried by the third current, and it may then return the third current to the third output port 606 via a third return cable 644.

The fourth output bus 617 may be coupled to a fourth output power cable 652 at the fourth output port 608. The fourth output power cable 652 may conduct the fourth current to a fourth power load 650. The fourth power load 650 may consume the power carried by the fourth current, and it may then return the fourth current to the fourth output port 608 via a fourth return cable 654.

The power distribution device 600 may include a return plate 686 and a return port 609. The return plate 686 may be coupled to the first 624, second 634, third 644, and fourth 654 return buses, and it may collect the returned first, second, third, and fourth currents. The return plate 686 may output a total returned current at the return port 609. A power ground cable 664 may be coupled between the return port 609 and the power source 660, and the power ground cable 664 may conduct the total returned current back to the power source 660.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A power distribution device, comprising:

an input port configured to receive power from a power source;

a plurality of sockets arranged along a first plane to form a matrix, each of the plurality of sockets including a first terminal and a second terminal, the first terminal coupled to the input port;

a plurality of output ports aligned along a second plane, each of the plurality of output ports coupled to the second terminal of each of the plurality of sockets respectively, the plurality of output ports configured to distribute the power to one or more power loads; and a connection device fitting into at least one of the plurality of sockets to deliver power between the first and second terminals of the at least one of the plurality of sockets, the connection device located adjacent to the at least one of the plurality of sockets and opposite from the second plane.

2. The power distribution device of claim 1, wherein the matrix includes a plurality of columns and a plurality of rows.

3. The power distribution device of claim 1, wherein:

the plurality of sockets include a first socket, a second socket, a third socket, and a fourth socket, and the first, second, third, and fourth sockets are arranged to form a two-by-two matrix.

4. The power distribution device of claim 1, wherein the plurality of sockets include:

a first socket, a second socket stacked against the first socket, a third socket positioned adjacent the first socket, and a fourth socket stacked against the third socket and positioned adjacent to the second socket.

5. The power distribution device of claim 1, further comprising:

a housing defining a first horizontal space and a second horizontal space positioned above the first horizontal space, wherein the plurality of output ports include a first output port and a second output port, and wherein the plurality of sockets include:

a first socket disposed within the first horizontal space, the first socket coupled to the first output port, and a second socket disposed within the second horizontal space, the second socket coupled to the second output port.

6. The power distribution device of claim 5, wherein:

the plurality of output ports include a third output port and a fourth output port, and the plurality of sockets include:

a third socket disposed within the first horizontal space and adjacent to the first socket, the third socket coupled to the third output port, and a fourth socket disposed within the second horizontal space and adjacent to the second socket, the fourth socket coupled to the fourth output port.

7. The power distribution device of claim 5, further comprising:

a first output bus coupling the second terminal of the first socket with the first output port, the first output bus having a first portion positioned within the first horizontal space; and a second output bus coupling the second terminal of the second socket with the second output port, the second output bus having a first portion positioned within the second horizontal space.

8. The power distribution device of claim 7, wherein the first portion of the first output bus is vertically aligned with the first portion of the second output bus.

9. The power distribution device of claim 7, wherein:

the first output bus includes a second portion coupled to the first output port, and the second output bus includes a second portion coupled to the second output port, such that the second portion of the second output bus is horizontally aligned with the second portion of the first output bus.

10. The power distribution device of claim 1, wherein each of the plurality of output ports includes:

a forward node coupled to the second terminal of one of the plurality of sockets, a return node configured to be coupled to a ground source, and an insulation plate stacked between the forward node and return node.

11. The power distribution device of claim 1, wherein:

the plurality of output ports include:

a first output port configured to be coupled to a first power load, a second output port configured to be coupled to a second power load, a third output port configured to be coupled to a third power load, and a fourth output port configured to be coupled to a fourth power load, the second output port is disposed between the first output port and the input port, and the third output port is disposed between the input port and the fourth output port.

12. The power distribution device of claim 1, further comprising:

a monitoring device coupled to the plurality of sockets, and configured to monitor the connection device.

13. A power distribution device, comprising:

a housing having an opening and defining a first horizontal space and a second horizontal space positioned above the first horizontal space, the housing having a first end and a second end opposing the first end;

a first socket disposed along the first end and within the first horizontal space, the first socket having first and second terminals, the first socket being exposed through the opening in the housing;

a second socket disposed along the first end and within the second horizontal space, the second socket having first and second terminals;

an input port coupled to the first terminals of the first and second sockets;

a first output port disposed along the second end, the first output port coupled to the second terminal of the first socket; and a second output port disposed along the second end and adjacent to the first output port, the second output port coupled to the second terminal of the first socket.

14. The power distribution device of claim 13, wherein:

the first output port is configured to be coupled to the first input port when the first socket is coupled to a first connection device, and the second output port is configured to be coupled to the first input port when the second socket is coupled to a second connection device.

15. The power distribution device of claim 13, further comprising:

a first output bus coupling the first output port with the second terminal of the first socket, the first output bus having a portion positioned within the first horizontal space; and a second output bus coupling the second output port with the second terminal of the second socket, the second output bus having a portion positioned within the second horizontal space.

16. The power distribution device of claim 13, further comprising:

a first output bus coupling the first output port with the second terminal of the first socket, the first output bus having a first portion coupled to the second terminal of the first socket; and a second output bus coupling the second output port with the second terminal of the second socket, the second output bus having a first portion coupled to the second terminal of the second socket, the first portion of the second output bus vertically aligned with the first portion of the first output bus.

17. The power distribution device of claim 16, wherein:

the first output bus includes a second portion coupled to the first output port, and the second output bus includes a second portion coupled to the second output port, such that the second portion of the second output bus is horizontally aligned with the second portion of the first output bus.

18. A power distribution device, comprising:

a first socket having first and second terminals, the first socket being exposed to allow for a first external connection;

a second socket vertically aligned with the first socket, the second socket having first and second terminals, the second socket being exposed to allow for a second external connection;

an input bus coupled to the first terminals of the first and second sockets;

an input port coupled to the input bus;

a first output bus having front and back portions, the front portion coupled to the second terminal of the first socket;

a first output port coupled to the back portion of the first output bus;

a second output bus having front and back portions, the front portion coupled to the second terminal of the second socket, the front portion of the second output bus vertically aligned with the front portion of the first output bus; and a second output port horizontally aligned with the first output port, the second output port coupled to the back portion of the second output bus.

19. The power distribution device of claim 18, wherein the back portion of the first output bus is horizontally aligned with the back portion of the second output bus.

20. The power distribution device of claim 18, further comprising:

a housing having front and back ends, wherein:

the first and second sockets are disposed along the front end, the first and second output ports are disposed along the back end, and the first and second output buses are disposed between the front and back ends.

* * * * *